United States Patent [19]

Rothamel

[11] Patent Number: 5,469,040
[45] Date of Patent: Nov. 21, 1995

[54] OPERATING CIRCUIT INCLUDING AN OSCILLATING CIRCUIT CAPACITOR COUPLED TO AN AUXILIARY WINDING FOR AN APPARATUS THAT MEASURES THE UNBALANCE OF A ROTARY MEMBER

[75] Inventor: Karl Rothamel, Seeheim, Germany

[73] Assignee: Hofmann Werkstatt-Technik GmbH, Germany

[21] Appl. No.: 915,608

[22] Filed: Jul. 21, 1992

[30] Foreign Application Priority Data

Jul. 22, 1991 [DE] Germany ................ 41 24 285.8

[51] Int. Cl.[6] ................................................ H02P 3/00
[52] U.S. Cl. ........................ 318/785; 318/109; 73/460
[58] Field of Search ............... 73/460–479; 310/68 R, 310/68 C; 318/105, 106, 109, 781, 785, 794, 795

[56] References Cited

U.S. PATENT DOCUMENTS

| | | | |
|---|---|---|---|
| 2,454,968 | 12/1948 | Fuge | 318/781 X |
| 3,484,670 | 12/1969 | Shankwitz | 318/781 |
| 3,646,601 | 2/1972 | Lash | 73/462 |
| 3,754,447 | 8/1973 | Turton-Smith et al. | 73/466 |
| 4,085,619 | 4/1978 | Shapiro et al. | 73/462 |
| 4,675,565 | 6/1987 | Lewus | 310/68 R |
| 4,734,601 | 3/1988 | Lewus | 310/68 E |
| 4,772,814 | 9/1988 | Lewus | 318/785 X |
| 4,794,288 | 12/1988 | Lewus | 310/68 R |
| 5,201,224 | 4/1993 | Rogers et al. | 73/462 |

FOREIGN PATENT DOCUMENTS 1938260  5/1971  Germany.

OTHER PUBLICATIONS

Patent Abstract of Japan, vol. 10, No. 282, JP–A–61–102533 dated May 21, 1986.

*Primary Examiner*—Richard Chilcot
*Assistant Examiner*—Joseph L. Felber
*Attorney, Agent, or Firm*—Cushman Darby & Cushman

[57] ABSTRACT

An operating circuit for use in an apparatus for measuring unbalance of a rotary member in which the drive for the rotary member is by means of a single-phase ac motor with a single-phase main winding and an auxiliary winding which is electrically displaced through 90°. Under at least approximately load-free operating conditions, a capacitor is connected in parallel with the auxiliary winding to reduce fluctuating angular speeds of the rotor of the motor when the motor is operating in an approximately load-free condition.

9 Claims, 3 Drawing Sheets

1

OPERATING CIRCUIT INCLUDING AN OSCILLATING CIRCUIT CAPACITOR COUPLED TO AN AUXILIARY WINDING FOR AN APPARATUS THAT MEASURES THE UNBALANCE OF A ROTARY MEMBER

BACKGROUND OF THE INVENTION

In a procedure for measuring the unbalance of a rotary member, for example a motor vehicle wheel, the rotary member is successively put into three operating conditions by a suitable drive arrangement, by means of an electric motor. In the first operating condition or phase, the rotary member which is subsequently to be balanced and on which therefore any unbalance has first to be measured is brought up to a speed of rotation which is referred to as the measuring speed of rotation. That phase of accelerating the rotary member to the measuring speed of rotation should take place as quickly and as smoothly as possible. In the second operating condition, when the rotary member is rotating at the measuring speed of rotation, any unbalance thereof is measured, with the rotary member being held at a speed which is as constant as possible. That phase should be as free as possible of oscillation and vibration phenomena which originate from the unbalance measuring assembly, more particularly the drive arrangement thereof. Finally, in the third operating condition or phase, after the unbalance of the rotary member has been suitably measured, the rotary member is slowed down and ultimately brought to a halt. That deceleration phase should also take place as quickly and as smoothly as possible.

Those requirements are best met by a drive comprising a three-phase motor which is connected to a three-phase network. If there is no three-phase network available, it is necessary to use a capacitor motor. That is a single-phase ac motor whose stator, in addition to the single-phase main winding in the main line of the power supply, also has an auxiliary winding which is electrically displaced through 90°. An auxiliary current which is phase-shifted through 90° can then be passed by way of the auxiliary winding. That phase shift is produced by a capacitor (operating capacitor) with which a starter capacitor is also connected in parallel, during start-up of the motor.

In operation of a single-phase ac motor of that kind, more especially a capacitor motor, it is found that pendulum oscillations, that is to say fluctuating angular speeds, of the rotor of the motor occur in the second operating condition of the unbalance measuring apparatus, that is to say during a measuring run during which any unbalance of a rotary member is measured while the rotary member is rotating at the at least substantially constant measuring speed of rotation. Such oscillations occur in particular in measuring runs involving a low level of load. For example, in the case of a balance machine for motor vehicle wheels, the mounting arrangement for carrying the rotary member is formed by a measuring spindle on which the wheel to be balanced is clamped. For the purposes of calibration or readjustment of the balancing machine, it may be necessary to carry out a measuring run without a wheel clamped on the measuring spindle, that is to say, a measuring run with a bare measuring spindle. That measuring run will tend to be impaired as a result of the above-mentioned pendulum oscillations or fluctuating angular speeds of the rotor of the motor, which will tend to cause the bare measuring spindle to rotate in an irregular fashion. That will not only adversely affect calibration of the machine but it can also give rise to a considerable amount of noise. The pendulum oscillations of the rotor of the motor, involving fluctuating angular speeds, are at double the frequency of the operating ac voltage (double the mains frequency) and, as has been found for the first time, are caused by an incomplete rotating field. In the usual capacitor motor, that rotating field is formed by a power supply circuit in which the operating capacitor is connected in series with the auxiliary winding and in parallel with the main winding.

SUMMARY OF THE INVENTION

An object of the present invention is to provide an apparatus for measuring the unbalance of a rotary member, which at least substantially reduces pendulum oscillations of the drive motor even when the motor is operating in a substantially load-free condition.

Another object of the present invention is to provide an apparatus for measuring unbalance of a rotary member which, using a single-phase ac motor such as a capacitor motor for the drive of the measuring apparatus, provides for substantial smoothness of operation under most operating conditions of the apparatus.

Still another object of the present invention is to provide an apparatus for measuring unbalance of a rotary member which ensures smoothness of operation while being of a generally simple design configuration.

In accordance with the present invention the foregoing and other objects are attained by an apparatus for measuring unbalance of a rotary member, such as in a wheel balancing machine for a motor vehicle wheel, comprising a mounting means for mounting the rotary member and, at the mounting means, measuring sensors for connection to an evaluation means for measuring the rotary member unbalance. The rotary member is driven in rotation by a drive means comprising a single-phase ac motor with a single-phase main winding in a main line of the power supply and an auxiliary winding which is electrically displaced through 90° in an auxiliary power supply line. The auxiliary winding, with a capacitor (oscillating-circuit capacitor), forms an oscillating circuit.

The oscillating-circuit capacitor can be used without an additional operating capacitor. The oscillating-circuit capacitor may also be a capacitor which is provided in addition to the operating capacitor, or it may be the operating capacitor which can be switched into the oscillating circuit, in particular in a measuring run which is carried out under at least approximately load-free conditions, that is to say at a constant speed of rotation in respect of the motor and the rotary member rotating therewith. An appropriate choice of the capacitance of the capacitor and the inductance of the auxiliary winding preferably provides an oscillating circuit into which energy is fed by way of the rotor of the motor by an inductive coupling effect. The energy required for maintaining the oscillations of the oscillating circuit can also be fed inductively into the oscillating circuit in some other fashion. That energy is stored for a fraction of a period, more particularly for example a quarter of a period, and outputted again, thereby producing a round or complete rotating field during a measuring run of the unbalance measuring apparatus, under normal unbalance measuring circumstances or when carrying out calibration or adjustment operations on the apparatus.

Further objects, features and advantages of the present invention will be apparent from the following description of preferred embodiments thereof.

DESCRIPTION OF THE PREFERRED EMBODIMENTS

Figure 1:
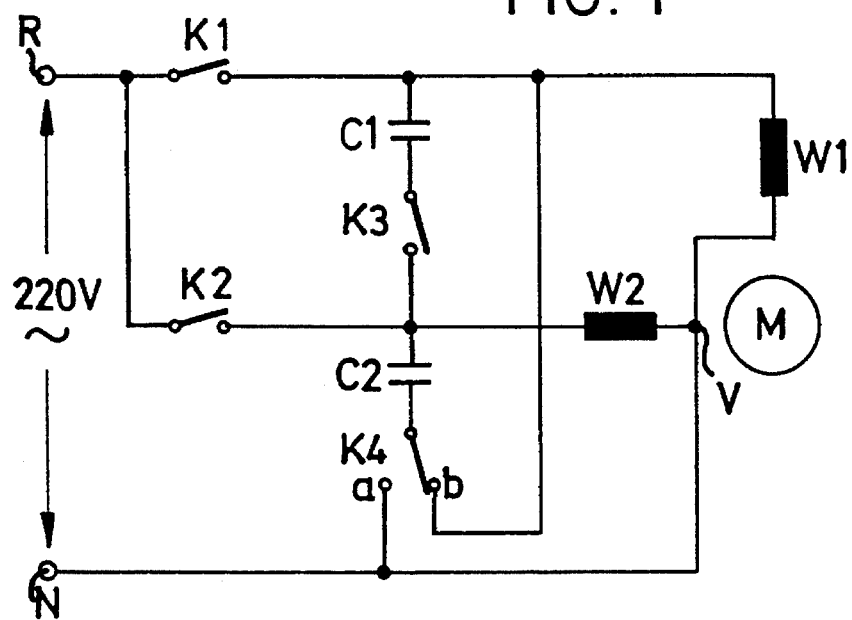
FIG. 1 shows a circuit diagram of a power supply circuit for a single-phase ac motor which is in the form of a capacitor motor and as a first embodiment serves as a drive for an unbalance measuring apparatus.

Referring generally to the accompanying drawings, shown therein is the operating circuitry for an apparatus for measuring unbalance of a rotary member such as a motor vehicle wheel, the apparatus comprising a mounting means for the rotary member with measuring sensors at the mounting means for connection to an evaluation means to ascertain any unbalance of the rotary member. The apparatus has a drive means for driving the rotary member in rotation, comprising a single-phase ac motor, more especially a capacitor motor, with its rotor as indicated at M in the drawings, with an associated power supply circuit comprising a main power supply line and an auxiliary power supply line. Disposed in the main line is a single-phase main winding W1 of the motor while disposed in the auxiliary line is a single-phase auxiliary winding W2. Like an asynchronous motor, which is connected in a two-pole (single-phase) manner, with a squirrel-cage rotor, the illustrated single-phase motor develops driving torques at positive and negative speeds of rotation. With co-operation of the rotor currents, there is an elliptical rotating field, which has a strength that of depends the instantaneous angular position of the rotor M of the motor, in the respective direction of the rotor M. A 90°-shifted auxiliary current can be passed through the additional auxiliary winding W2 which is electrically displaced through 90°. The phase shift can be produced by means of a capacitor C2 which can be connected as an operating capacitor.

As the optimum auxiliary current depends on the speed of rotation of the motor, a starter capacitor C1 is also connected in parallel during the start-up phase with the capacitor C2 when it is connected as the operating capacitor.

In order to set the various operating conditions of the single-phase ac motor for the drive of the balancing machine, the first embodiment as shown in FIGS. 1 through 4 has different switch or contact devices as indicated at K1 through K4.

Figure 2:
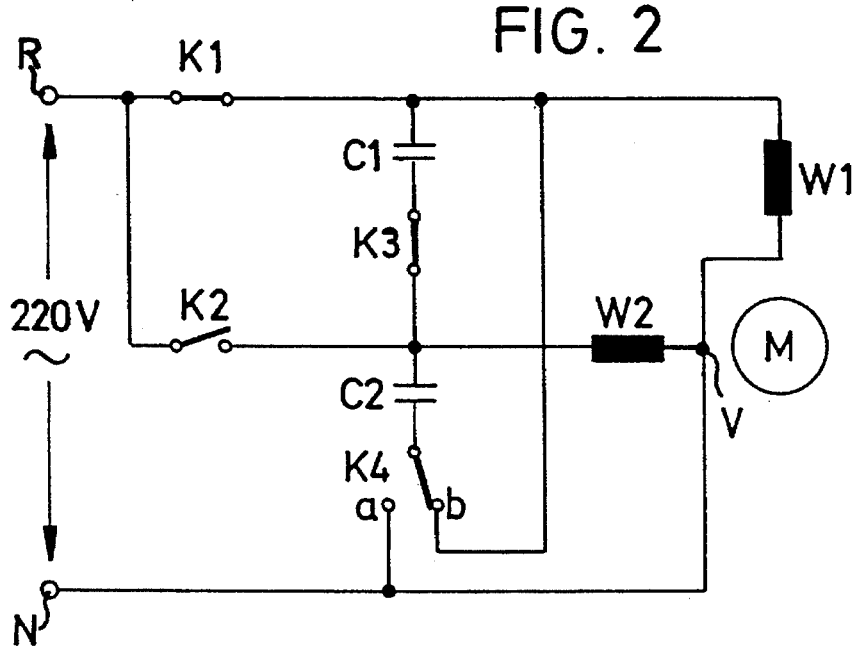
FIG. 2 shows the condition of the FIG. 1 circuit when starting up the ac motor.

The contact device K1 serves to connect the power supply circuit comprising the main line with the main winding W1 and via K4, B and C2 the auxiliary line with the auxiliary winding W2 to a single-phase network comprising a neutral conductor N and a main conductor R and operating for example at 220 volts ac voltage. When the contact device K1 is closed, as shown in FIG. 2, the rotor M of the motor is driven at a positive speed of rotation in the forward direction.

The contact device K2 also serves to connect the power supply circuit comprising the main line and the auxiliary line to the single-phase network. When the contact device K2 is closed, as shown in FIG. 4, the motor is decelerated.

The contact device K3 serves for connecting the starter capacitor C1 into circuit. When the contact device K3 is closed, for example as shown in FIG. 2, the starter capacitor C1 is connected in series with the auxiliary winding W2 and in parallel with the main winding W1.

Figure 3:
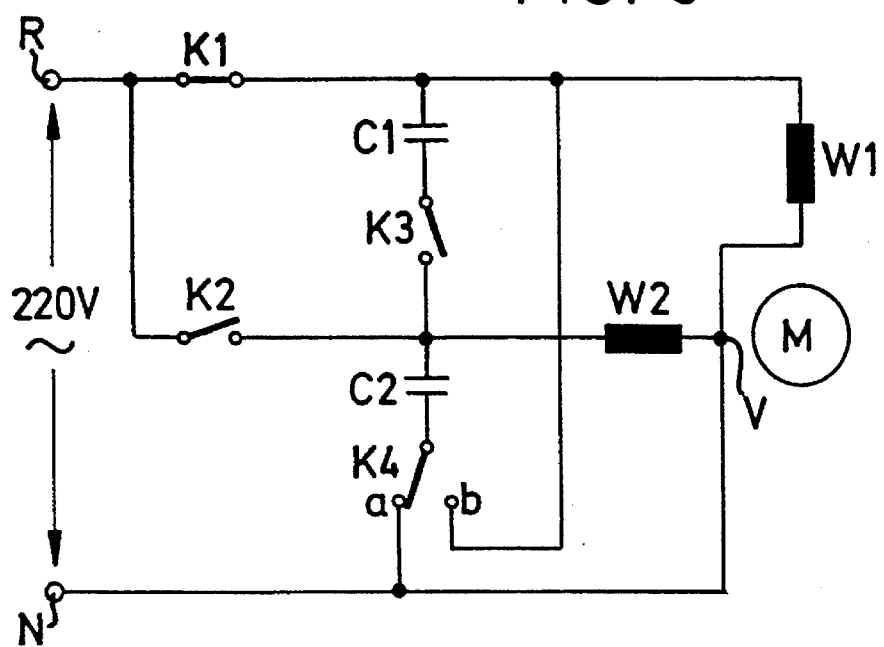
FIG. 3 shows the operating condition of the FIG. 1 circuit in an unbalance measuring run, that is to say when measuring unbalance of a rotary member to be balanced or when carrying out a calibration or adjustment procedure (an approximately load-free run)

The contact device K4 has a change-over switching function and can connect the capacitor C2 in parallel with the auxiliary winding W2 when the contact device K4 is in a switching position as indicated at a, for example as shown in FIG. 3. When the contact device K4 is in switching position b as shown for example in FIGS. 1, 2 and 4, the capacitor C2 is connected in series with the auxiliary winding W2 and then acts as an operating capacitor.

Figure 4:
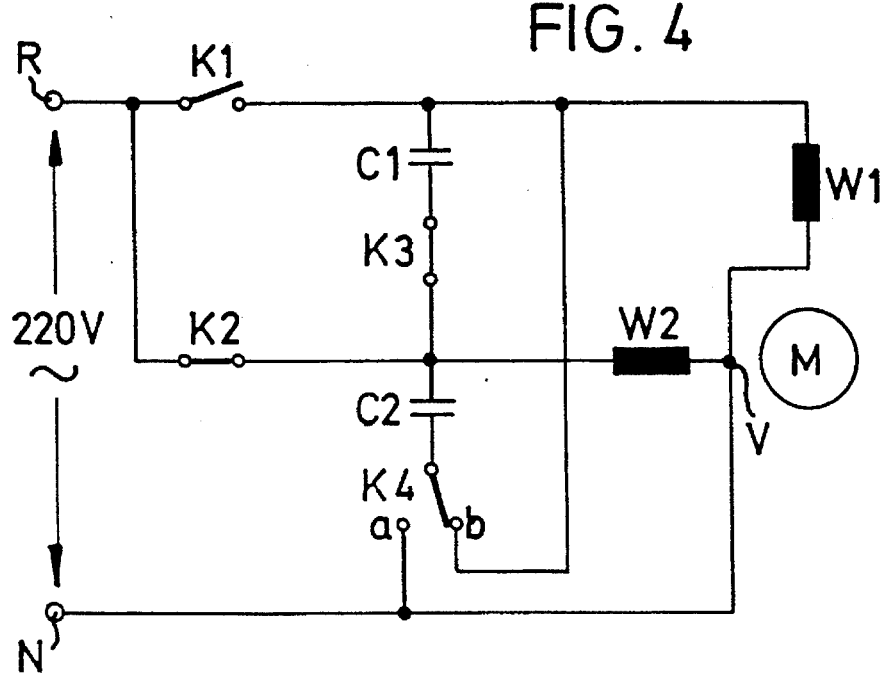
FIG. 4 shows the operating condition of the FIG. 1 circuit when decelerating a rotary member after an unbalance measuring run.

Reference will now be made to FIGS. 2 through 4 to describe in greater detail the various operating conditions of the circuitry which can be adopted.

Looking first at FIG. 2, shown therein is an operating condition in which a rotary member to be balanced, which is carried by the mounting means of the balancing machine, is accelerated to the measuring speed of rotation by the drive of the electric motor. In that phase of operation, the contact devices K1 and K3 are closed, the contact device K2 is open and the contact device K4 is in switching position b. In that operating condition of the circuitry the rotor M of the drive motor is driven in the forward direction and the rotary member on which any unbalance is to be measured is accelerated to the measuring speed of rotation. In that operating condition therefore, the two capacitors C1 and C2 are connected in series with the auxiliary winding W2.

When the rotary member to be balanced has been brought up to the measuring speed of rotation, the contact device K3 is opened so that only the capacitor, C2, which acts as the operating capacitor is connected in series with the auxiliary winding W2.

FIG. 3 shows the operating condition of the circuitry, which occurs in a measuring run with approximately load-free operation for the motor. That situation involves a constant speed of rotation, when the balancing machine is in the form of a universal machine with a pair of mounting units, or in the case of a balancing machine equipped with a measuring spindle for carrying a rotary member to be balanced. In that condition, pendulum oscillations, that is to say fluctuating angular speeds, of the rotor M of the drive motor are avoided.

In order to carry out a measuring run on the unbalance measuring apparatus, the contact devices K1 through K4 are moved into the positions shown in FIG. 3. In that operating condition, a measuring run is carried out with a zero rotary member or with a bare measuring spindle for calibration or adjustment purposes or with a body requiring unbalance compensation, in the case of a normal unbalance measuring operation, after the apparatus has been accelerated to the measuring speed of rotation for example in accordance with the start-up operating condition described above with reference to FIG. 2.

When the circuitry is in the condition shown in FIG. 3, the contact device K1 is closed and the contact devices K2 and K3 are both open. The contact device K4 is in its switching position a. With that circuitry, the capacitor C2 is in the line extending from the junction V between the main line and the auxiliary line to the neutral conductor N of the power supply network, and it is connected in parallel with the auxiliary winding W2. The auxiliary winding W2 and the capacitor C2 thus form an oscillating circuit. The energy for the oscillating circuit is introduced by way of the rotor M of the motor and is stored for a fraction of a period and then outputted again whereby a round or complete rotating field can be produced. That energy is preferably stored for a quarter of a period in the capacitor C2 and then outputted again.

In that configuration one plate or side of the capacitor C2 is connected to the junction between the starter capacitor C1, which can be connected into circuit by way of the contact device K3, and the end of the auxiliary winding W2 which is remote from the above-mentioned junction V. The other side or plate of the capacitor C2 is connected to the neutral conductor N of the network, by way of the contact K4 which has been put into the switching position a.

In FIG. 4, the rotary member is being decelerated. For that purpose the contact device K1 is open and the contact devices K2 and K3 are closed. The contact device K4 remains in its switching position b.

In the first embodiment as illustrated in FIGS. 1 through 4, the capacitance of the capacitor C2 is for example 10 μf. As discussed above with reference to FIG. 2, the capacitor C2 can also be used as the operating capacitor. The capacitance of the starter capacitor C1 can be for example 25 μf, the main winding may have for example an inductance of 210 mH and the auxiliary winding has an inductance of 230 mH.

Figure 5:
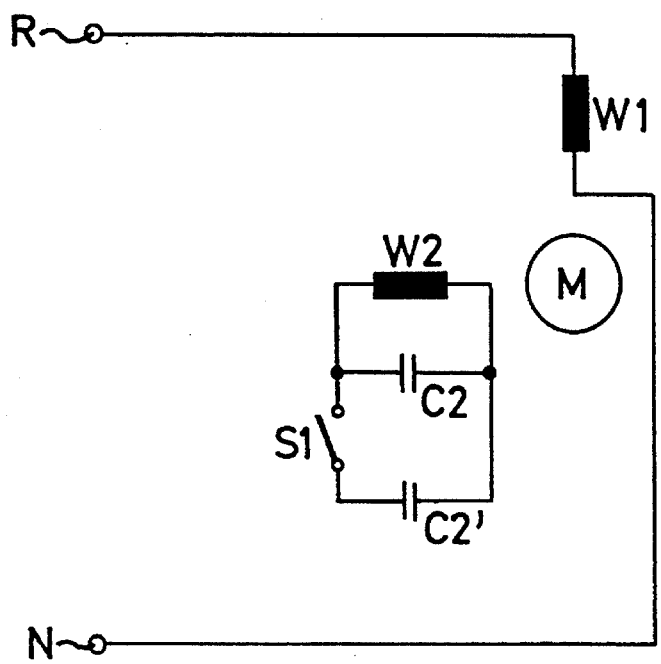
FIG. 5 shows a circuit diagram for a second embodiment of the invention.

Referring now to FIG. 5, in the embodiment of the apparatus according to the invention as illustrated therein, unlike the embodiment illustrated in FIGS. 1 through 4, the main and the auxiliary windings W1 and W2 are separate from each other, that is to say this embodiment does not involve the above-mentioned junction V. In the FIG. 5 embodiment, the oscillating circuit comprising the auxiliary winding W2 and the oscillating capacitors C2 and C2' respectively is an independent circuit which receives its supply of energy inductively by way of the rotor M of the drive motor. For the purposes of adaptation to different frequencies of the operating ac voltage, the circuit has first and second capacitors C2 and C2' which can be connected into the oscillating circuit in parallel with each other by means of a switch as diagrammatically indicated at S1. In that way, it is possible to produce two different oscillating circuit capacitances which are adapted to different frequencies, for example 50 Hertz or 60 Hertz. It will be appreciated that it is also possible for the two capacitors C2 and C2' to be connected in series with each other by the switch S1 in order to provide for an alteration in the oscillating circuit capacitance, to adapt it to the mains frequency. The possibility of providing for first and second different oscillating circuit capacitances for adaptation to mains frequencies may also be employed in a corresponding manner in the embodiment of the invention shown in FIGS. 1 through 4.

Figure 6:
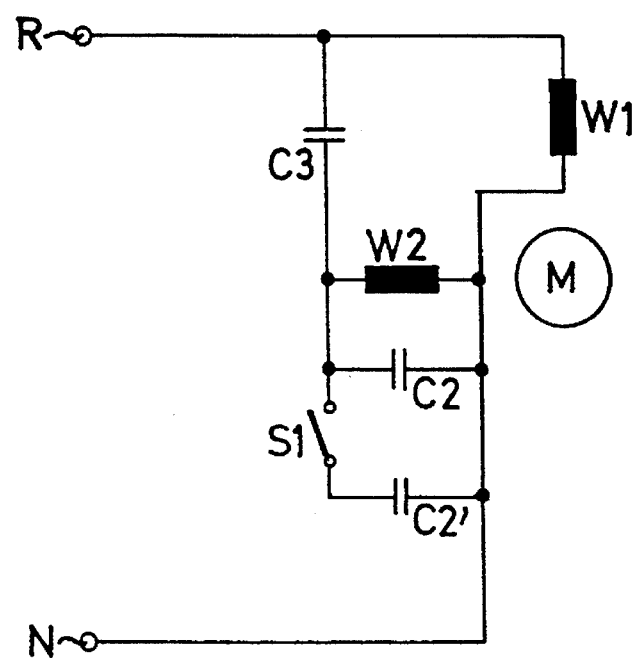
FIG. 6 shows a circuit diagram for a third embodiment of the invention.

The embodiment of the invention illustrated in FIG. 6 also has an additional operating capacitor C3 of relatively small capacitance, for example 2 μF. Mechanical frictional losses can be compensated by means of the capacitor C3.

It will be noted that the embodiments shown in FIGS. 5 and 6 may additionally include a starter and braking capacitor, as in the first embodiment described above with reference to FIGS. 1 through 4.

It will be appreciated that the above-described arrangements have been set forth solely by way of example and illustration of the principles of the present invention and that various other modifications and alterations may be made therein without thereby departing from the spirit and scope of the present invention.

What is claimed is:

1. An operating circuit for an apparatus for measuring the unbalance of a rotary member mounted to be driven by a rotary drive, said operating circuit comprising:

a main power supply line;

an auxiliary power supply line;

a single-phase ac motor with a single-phase main winding in said main power supply line;

an auxiliary winding in said auxiliary power supply which is electrically displaced through 90° line with respect to said main winding;

an oscillating circuit capacitor which with said auxiliary winding forms an oscillating circuit for operating said rotary member; and means for switching said oscillating circuit capacitor into a parallel connection with said auxiliary winding under a condition of approximately load-free operation.

2. The circuit as set forth in claim 1, wherein said oscillating circuit is independent of an operating ac voltage.

3. The circuit as set forth in claim 1, further comprising means for switching over between a first and a second capacitance for said oscillating circuit, for adaptation to a frequency of an operating ac voltage.

4. The circuit as set forth in claim 1, wherein energy is inductively fed into said oscillating circuit by way of a rotor of said motor.

5. The circuit as set forth in claim 4, wherein said energy fed into said oscillating circuit is stored by oscillating-circuit capacitor for a respective fractional cycle and then outputted.

6. The circuit as set forth in claim 1, wherein said oscillating circuit capacitor which is adapted to be switched into said oscillating circuit is an operating capacitor in a power supply circuit.

7. The circuit as set forth in claim 1, further comprising a starter/braking capacitor and means for switching said starter/braking capacitor into a power supply circuit in each of a start-up and a braking mode.

8. The circuit as set forth in claim 1, further comprising an operating capacitor connected in series with said auxiliary winding, in addition to said oscillating circuit capacitor.

9. An operating circuit for an apparatus for measuring unbalance of a rotary member including a single-phase ac drive motor with a single-phase main winding means and an auxiliary winding means electrically displaced through 90° relative to said main winding means, said operating circuit comprising:

a power supply circuit having a main line including said main winding means;

an auxiliary line including said auxiliary winding means;

means for connecting said power supply circuit to an ac power source; and a capacitor co-operable with said auxiliary winding means to form an oscillating circuit; and means for switching said capacitor into a parallel connection with said auxiliary winding means under a condition of approximately load-free operation.

* * * * *